United States Patent [19]

Koga et al.

[11] Patent Number: 4,523,286

[45] Date of Patent: Jun. 11, 1985

[54] APPARATUS FOR MAKING DIAGNOSIS OF VALVE DEVICE IN TURBINE SYSTEM

[75] Inventors: Tsuguaki Koga; Hidesumi Kuwashima; Hidenori Inoue; Hidetoshi Hamaoka; Hiroshi Ohta, all of Hitachi, Japan

[73] Assignees: Hitachi, Ltd.; Hitachi Engineering Co.; Hitachi Service Engineering Co., Ltd., all of Tokyo, Japan

[21] Appl. No.: 405,350

[22] Filed: Aug. 5, 1982

[30] Foreign Application Priority Data

Aug. 7, 1981 [JP] Japan .............................. 56-122972
Aug. 7, 1981 [JP] Japan .............................. 56-122973

[51] Int. Cl.³ ............................................ F16K 37/00
[52] U.S. Cl. .......................................... 364/494; 73/9;
137/551; 137/554; 137/557; 364/550
[58] Field of Search ............... 364/494, 551, 552, 550;
60/39.03, 39.091; 415/118; 137/554, 557, 551;
73/9, 168

[56] References Cited

U.S. PATENT DOCUMENTS 4,029,122 6/1977 Jaegtnes .............................. 73/9 X
4,090,065 5/1978 Braytenbah et al. ............... 364/494
4,274,438 6/1981 La Coste .......................... 137/551
4,404,637 9/1983 Walters et al. .................... 364/494

Primary Examiner—Errol A. Krass
Assistant Examiner—Edward R. Cosimano
Attorney, Agent, or Firm—Antonelli, Terry & Wands

[57] ABSTRACT

A diagnostic apparatus for diagnosising of a valve device in a turbine system comprises at least one of a pressure sensor for sensing hydraulic pressure in a hydraulic cylinder for driving a valve body of the valve device and a position sensor for sensing the displacement of the valve body, and a processing device for processing the output signal from the above-mentioned at least one sensor. The processing device has an offset computing device which receives a signal representing the actual operating state of the valve device obtained on the basis of the output signal from the at least one sensor and a signal corresponding to a reference value obtained under the normal operating state of the valve device. The offset computing device is operable to compute the offset between the signals received thereto. A judging device is provided for judging as to whether or not there is a symptom of a sticking in the valve device, in accordance with the output signal from the offset computing device.

12 Claims, 14 Drawing Figures

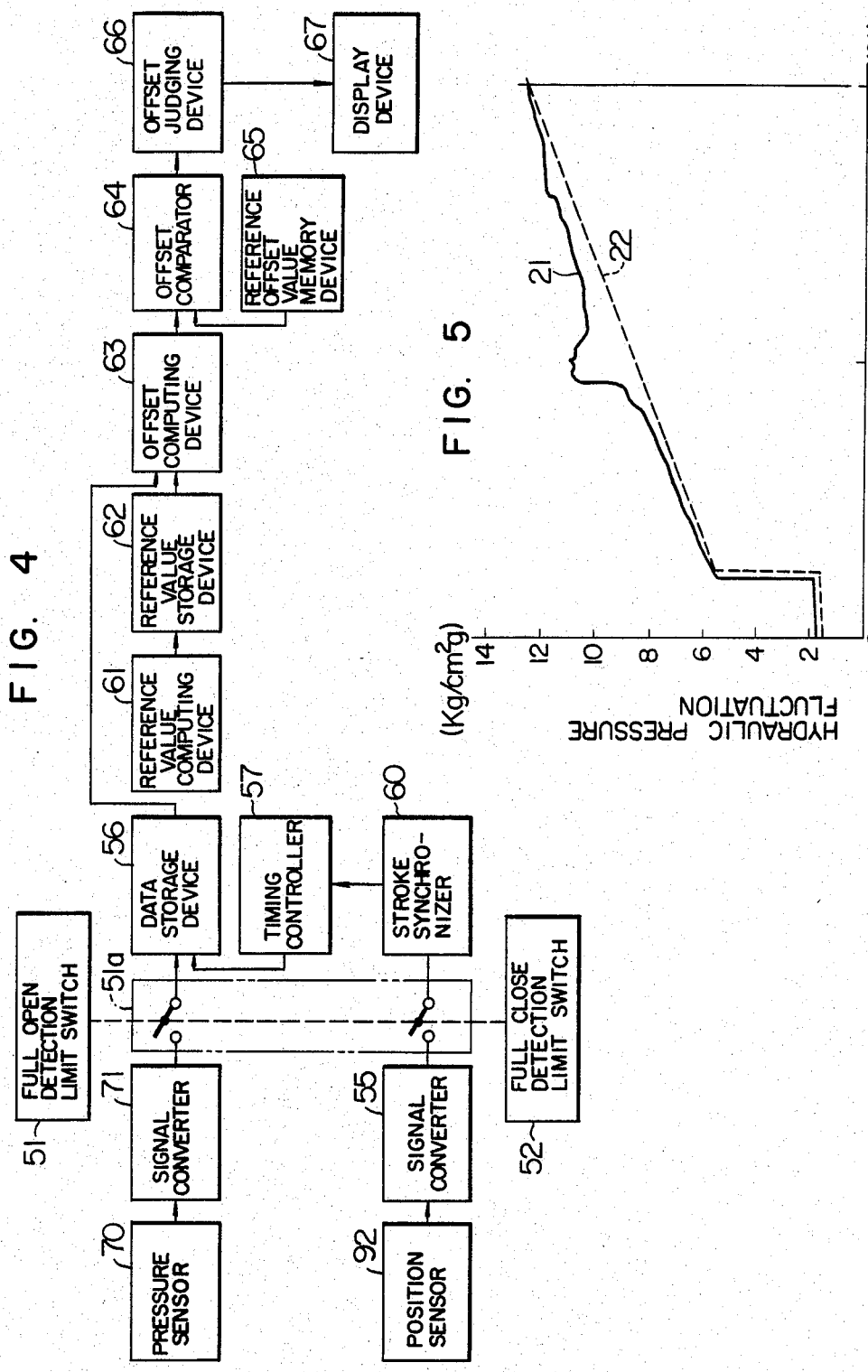

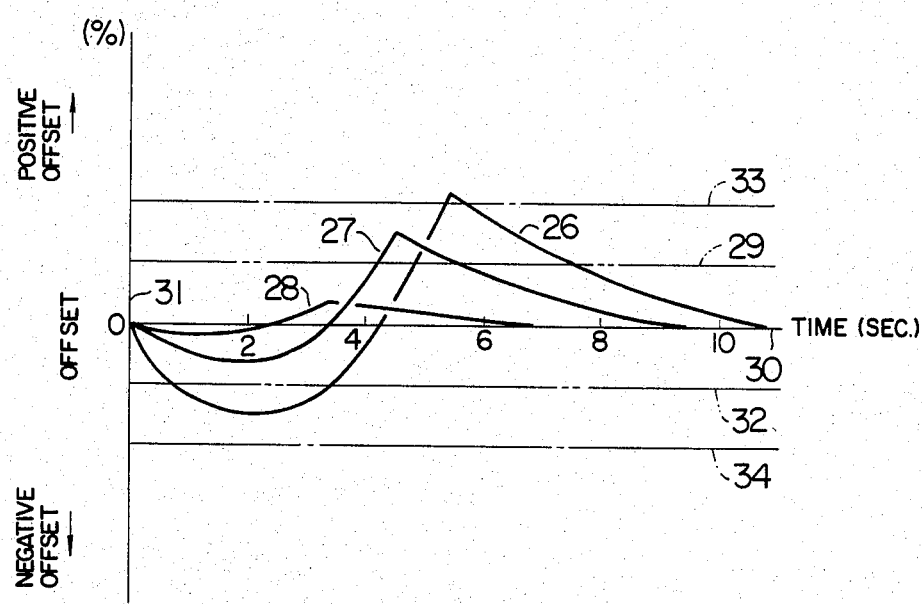

APPARATUS FOR MAKING DIAGNOSIS OF VALVE DEVICE IN TURBINE SYSTEM

BACKGROUND OF THE INVENTION

The present invention relates to an apparatus for automatically diagnosing a state of operation of various valve devices for controlling fluids of high temperatures such as steam in, for example, a steam turbine system and gas in, for example, a gas turbine system.

In a steam turbine system, major valve devices such as main steam stop valve, reheat steam stop valve, intercept valve and turbine bypss valve are the essential and important constituents and, hence, are required to operate with a high reliability. From this point of view, it is a matter of great significance to continuously observe these valve devices and to detect signs of trouble, if any, at an early stage.

One of the most serious problems in such valve devices is a sticking of the valve. More specifically, the sticking of the valve is a phenomenon in which the initial smooth sliding between a movable part such as a valve rod and hydraulic piston and cooperating stationary part is lost to prevent sliding motion of the movable parts. Usually, the sticking of valve does not take place suddenly but is preceded by various symptoms such as unsmoothed sliding, vibration, chattering or the like. As the valve is left unrepaired, these symptoms are gradually developed to finally cause the the valve to stick. In order to prevent the sticking of a valve, therefore, it is essential to detect any symptom or extraordinary state of the valve and to take a suitable countermeasure at an early stage.

The observation and diagnosis of the major valve devices of turbine system in power generating plant or the like for detecting any symptom of a valve sticking has been made through a valve check usually conducted once a day. The valve test is executed by driving the valve from a fully open position to a fully close position and vice versa by a manual testing system, under the visual check by an operator. This conventional diagnostic method, however, is effective only to comparatively heavy or distinctive abnormality detectable by visual check but is quite ineffective for the detection of light or slight symptom of trouble.

Accordingly, it is a primary object of the invention to provide an apparatus for diagnosing valve devices in a turbine system, capable of accurately and sensitively detecting any trouble symptoms in the valve device.

To this end, according to one aspect of the invention, a diagnostic apparatus for diagnosing the state of a valve device in a turbine system includes a first sensor means for sensing the state of operation of the valve device, with a second sensor means being adapted to sense that the valve device is in the fully open position. A third sensor means is adapted to sense that the valve device is in the fully closed position, with a processing means being operatively connected to the first sensor means and being adapted to judge whether there is any abnormality in the operation of the valve device in accordance with the output from the first sensor means and to display the result of the judgement.

According to another aspect of the invention, a diagnosing the state of a valve device in a turbine system is accomplished by making a valve body of the valve device travel the fully stroke between a full open positon and a fully closed position; sensing at least one of the displacement of the valve body and the fluctuation of hydraulic pressure in a hydraulic cylinder for driving the valve body and obtaining data corresponding thereto, during the full stroke travelling of the valve body; processing the data and comparing the data with reference values representing the normal operating state of the valve device; and judging as to whether or not there is any abnormality in the valve device in accordance with the result of the comparison and displaying the result of the judgement.

The above and other objects, features and advantages of the invention will become more clear from the following descrption of the preferred embodiments when the same is read in conjunction with the accompanying drawings.

BRIEF DESCRIPTION OF THE DRAWINGS

FIG. 4 is a block diagram of a processing unit incorporated in the first embodiment;

FIG. 5 shows an example of the hydraulic pressure variation in hydraulic cylinder in relation to the valve stroke actually measured of the major steam stop valve, in comparison with the reference values of the hydraulic pressure;

FIG. 14 shows the state in which the actually measured stroke variation characteristics is deviated from the reference stroke variation characteristics due to the occurrence of a sticking of the valve.

Throughout the drawings, the same or similar reference nummerals are used to denote the same or similar parts of the apparatus.

DETAILED DESCRIPTION

Figure 1:
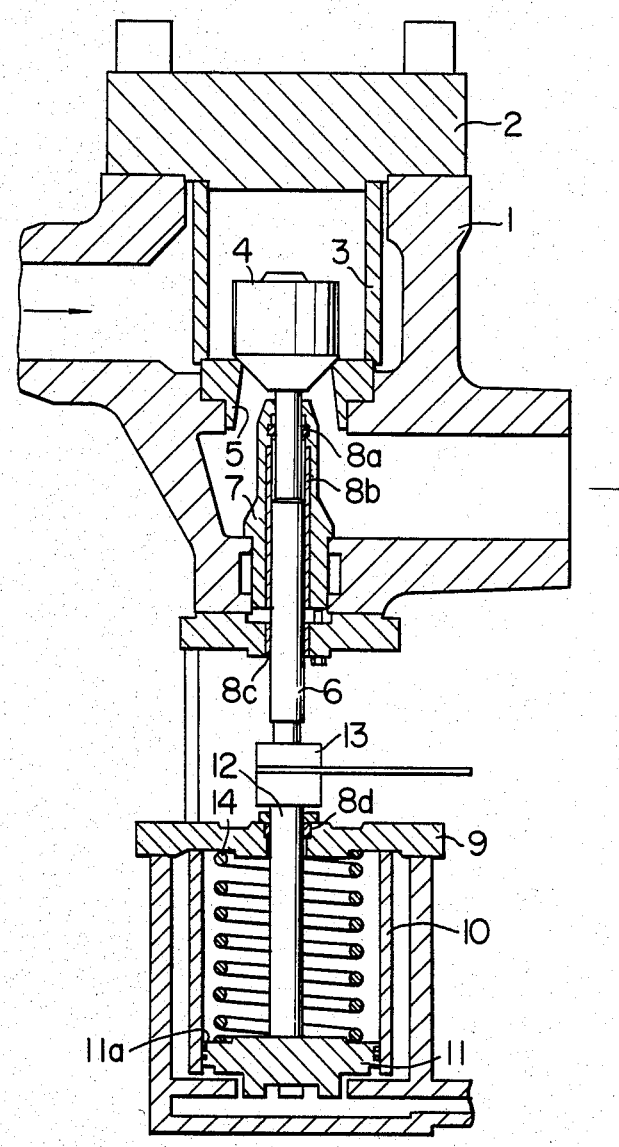
FIG. 1 is a vertical sectional view of a major steam stop valve incorporated in an ordinary steam turbine system.

As shown in FIG. 1, the main steam stop valve has a main valve casing 1 provided with an upper cover 2 and accommodates a strainer 3, with main valve casing 1 incorporating therein a valve seat 5. The main steam stop valve has a valve body 4 integral with a valve rod 6 slidably held by bushes 8a, 8b and 8c, disposed in a housing such that the valve body 4 is movable into contact with and away from the valve seat 5. The valve body 4 is adapted to be driven by a driving mechanism which includes a hydraulic actuator 9, hydraulic cylinder 10, piston 11, slidably received by the cylinder 10 and a piston rod 12 connected to the piston 11, with piston rings 11a being fitted around the piston 11. The piston rod 12 is slidably held by a bush 8d fitted in a bore formed in the hydraulic actuator 9, and is coupled to the valve rod 6 by means of a coupling 13. The piston 11 is normally urged downwardly by a compression spring 14.

The above described main steam stop valve often encounters various troubles, one of which is the sticking of the valve explained hereinabove. In most cases, the sticking of the main steam stop valve is caused by a seizure, scuffing or the like extraordinary state of sliding between the valve rod 6 and the bushes 8a to 8c which takes place when the appropriate gap therebetween is lost. The failure in maintaining the appropriate gap is attributable to various reasons such as generation and depositon of scale, invasion of foreign matter, bending of the valve rod, centering failure in the coupling 13 and so forth. The cause of the valve stick does not always reside in the main steam stop valve but in some cases resides in the hydraulic actuator 9. Namely, an extraordinary increase of the gap beween the piston 11 and the cylinder 10, failure in the piston ring 11a and failure in the bush 8d may lead to the valve sticking.

As stated before, the valve sticking does not take place suddenly but is preceded by symptoms such as an unsmooth sliding motion, vibration or chattering with such symptoms being gradually developed to finally cause the sticking of the valve. In order to avoid the sticking of the valve, it is essential to detect the slight symptom or abnormality in the valve operation and to take a suitable countermeasure at an early stage.

Figure 2:
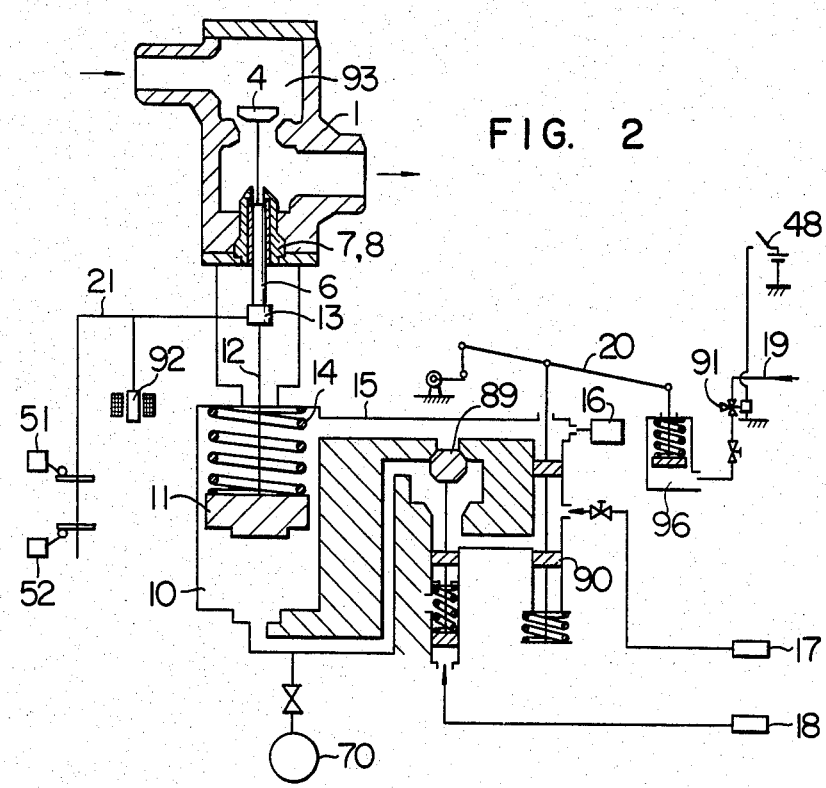
FIG. 2 is a schematic illustration of the major steam stop valve shown in FIG. 1, equipped with a turbine valve device diagnostic apparatus in accordance with a first embodiment of the invention.

The inspection of the major steam valves in turbine system of a power generating plant or the like is made through a valve test which is conducted once a day by driving each valve from a fully open position to a fully closed position and vice versa by means of a manual testing system shown in FIG. 2 an to permit the operator to visually check the valve for any abnormality in the valve operation. As shown in FIG. 2, the upper chamber of a hydraulic cylinder 10 is normally communicated with an oil tank 16 through a drain circuit 15. As a control oil is supplied by a control oil supply device 17 into the lower piston chamber in the hydraulic cylinder 10, the piston 11 is moved upward overcoming the force of the compression spring 14 to move the valve body 4 away from the valve seat 5. As the supply of the hydraulic oil is stopped, the piston 11 is lowered by the force of the compression spring 14 so that the valve body 4 is brought into the closing position where it contacts with the valve seat 5. A relay damp valve 89 for an emergency tripping of the valve is normally closed by being pushed up by the oil supplied from the emergency tripping oil supply device 18. As the supply of the emergency tripping oil is terminated, the relay damp valve 89 is opened to permit the lower piston chamber in the hydraulic cylinder 10 to be communicated with the oil tank 16 so that the valve body 4 is brought to the closing position instantaneously.

The daily test of valve operation is conducted in the following manner.

As a test switch 48 is closed, a test solenoid valve 91 is opened to permit compressed air 19 to flow into the lower piston chamber of the pneumatic cylinder 96 to actuate a lever 20. Consequently, a test pilot valve 90 is moved upward to intercept the control oil from the control oil supply device 17. As a result, the piston 11 in the hydraulic cylinder 10 is lowered to bring the valve body 4 into the closing position. Then, as the switch 48 is opened, the valve body 4 is moved to the open position by a reversing operation of the test deice. During the driving of the valve from the open position to the closed position and vice versa, the operator visually checks the motion of the valve for any abnormality.

This inspection method, however, is effective only to heavy or distinctive abnormalities in the valved motion visually or audibly detactable by the operator and, consequently, there is a fear that even a skilled and trained operator may overlook a slight symptom of trouble in the valve device.

As shown in FIG. 2, a turbine valve device diagnostic apparatus according to the present invention is combined with the main steam stop valve and the manual valve testing system described hereinabove for observing and diagnosing any symptom of a sticking of the main steam stop valve. More specifically, as shown in FIG. 2, the diagnostic apparatus includes a pressure sensor 70, attached to the hydraulic cylinder 10, for detecting the hydraulic pressure in the latter, a position sensor 92 connected through a lever device 21 to the coupling 13 interconnecting the valve rod 6 and the piston rod 12 so as to detect the position or displacement of the valve body 4, a limit switch 51 hereinafter referred to as a fully open detection limit switch, for detecting the valve body 4 in the fully open position and a limit switch 52, hereinafter referred to as a fully closed detection limit switch, for detecting the valve body 4 in the full close position.

Figure 3:
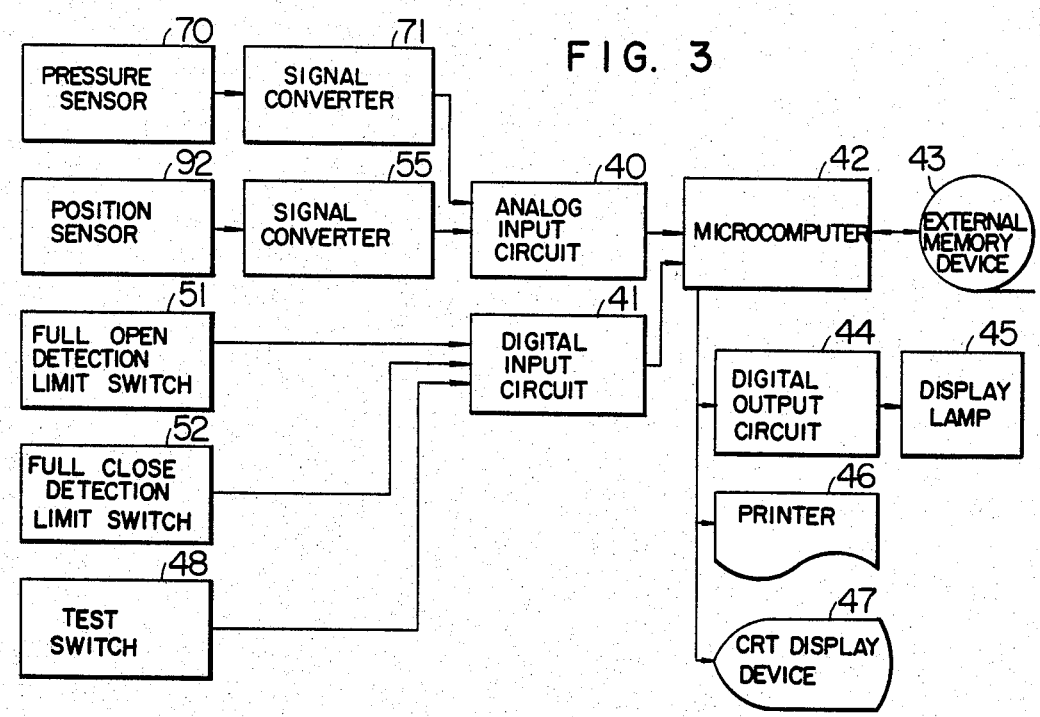
FIG. 3 is a block diagram of the hardware of the first embodiment.

As shown in FIG. 3, the diagnostic apparatus has a digital input circuit 41 adapted to receive the output signals from the fully open detection lmit switch 51 and the fully closed detection limit switch 52, as well as the output from the test switch 48. The hydraulic pressure in the hydraulic cylinder 10 is detected by the pressure sensor 70 and is converted by a signal converter 71 into a voltage or electric current signal of a level corresponding to the hydraulic pressure. The mechanical motion of the position sensor 92 is changed by a signal converter 55 into a voltage or electric current signal of a level corresponding to the stroke of the valve. The voltage or electric current signals thus obtained are delivered to an analog input circuit 40 and are processed by a microcomputer 42. The result of the processing performed by the microcomputer 42 is put on display by a display lamp 45 through a digital output circuit 44 and outputted to a printer 46 or a CRT display device 47. The data obtained in the past operation are all stored in an external memory device and are read out as required.

As shown in FIG. 4, the processing unit in the diagnostic apparatus of the invention the mechanical motion of the position sensor 92 detecting the position of the valve is transmitted to the signal converter 55 while the hydraulic pressure in the hydraulic cylinder is transmitted to the signal converter 71 through the pressure sensor 70. The mechanical motion and the hydraulic pressure are changed into voltage or electric current signals by respective signal converters 55, 71. The signals derived from these signal converters are delivered to a data storage device 56 through a gate 51a which is adapted to be opened and closed by the fully open detection limit switch 51 and the fully closed detction limit switch 52. More specifically, the gate 51a is closed when both of the limit switches 51 and 52 are opened but is opened if either one of these limit switches is closed. The hydraulic pressure signal is fed fom the signal converter 71 to the data storage device 56, while the stroke signal representative of the displacement or stroke of the valve body is delivered by the signal converter 55 to a stroke synchronizer 60. The stroke synchronizer 60 is adapted to deliver a signal to a timing controller 57 at each time the actually obtained stroke signal reaches a hydraulic signal sampling stroke of a predetermined interval, and a timing signal is inputted to the data storage device 56 in accordance with the signal delivered to the timing controller 57. Thus, the data storage device 56 intermittently stores the actually measured hydraulic pressure at a constant valve stroke interval, i.e. at each time the displacement of the valve body reaches a predetermined value or distance. The data storage device 56 delivers its content to an offset computing device 63. Meanwhile, a reference value computing device 61 computes the reference hyraulic pressure value at a predetermined hydraulic pressure sampling stroke interval, and delivers the result of the computation to a reference value storage device 62, the output of which is fed to the offset computing device 63. Upon receipt of the hydraulic presure signal and the reference signal, the offset computing device computes the difference therebetween, i.e. the offset of the actual value from the reference value.

As described hereinabove, the diagnostic aparatus of the first embodiment functions to store the reference values and is constructed to compare the electric signals from respective sensors with the reference value to permit the computation of the offset from the reference value.

In addition to the above-explained function and arrangement, the diagnostic apparatus of the first embodiment has a reference offset value memory device 65 for prestoring the reference offset values, an offset comparator 64 for comparing the offset value computed by the offset computing device 63 with the reference offset value read out from the reference offset value memory device 65, and a judging device 66 for judging whether there is any abnormality of the valve motion in accordance with the result of the comparison.

Thus, the diagnostic apparatus of this embodiment is constructed to store the reference offset values and to evaluate and judge the computed offset value through comparison with the reference offset values. The output from the offset judging device 66 is fed to a display device 67 adapted to display the result of the judgement performed by the offset judging device 66.

The valve device diagnostic apparatus of this embodiment, having the above-described construction, operates in a manner explained hereinunder. As stated above, the valve body 4 is actuated to close and open, respectively, as the test device switch 48 shown in FIG. 2 is closed and opened. The fully open detection limit switch 51 is opened when the valve body 4 starts to move in the closing direction, and the fully closed detection limit switch 52 is closed when the valve body 4 is completely seated on the valve seat after travelling the full stroke from the full open position to the full close position. The position sensor 92 moves following up the movement of the valve body 4 when the latter is moved in the closing direction.

As the fully open detection limit switch 51 is opened, as shown in FIG. 4, a switch 51a associated with the limit switch 51 is closed so that an electric signal representing the positon of the valve body, produced by the signal converter 55, is delivered to the stroke synchronizer 60. At the same time, the pressure signal representing the hydraulic pressure in the hydraulic cylinder corresponding to the instant valve body position is delivered in the form of an electric signal from the signal converter 71 to the data storage device 56. Since the capacity of the data storage device 56 is limited, it is necessary to sample the data at a predetermined interval of the stroke. Thus, the signals thus obtained are intermittently delivered to the data storage device 56 at a predetermined stroke interval. Namely, the stroke synchronizer 60 operats to deliver a storage timing signal to the timing controller 57 at each time the measured stroke value reaches a predetermined pressure sampling stroke value, and the above-mentioned signal is delivered to the data storage device 56 from the timing controller 57. Consequently, the hydraulic pressure signals are sampled at a predetermined stroke interval and the sampled hydraulic pressure signals are stored in the data storage device 56. The supply of the hydraulic pressure signal is terminated when the full close detrection limit switch 52 is turned on, so that the delivery of the data to the data storage device 56 is ceased. In FIG. 5, the abscissa represents the closing stroke (%) of the valve body while the ordinate represents the fluctuation of hydaulic pressure (Kg/cm² g) in the hydraulic pressure for driving the valve body. The full-line curve 21 shows the hydraulic pressures stored during the test valve driving in the closing direction. Although this curve is continuous, this curve actually consists of numerous dots because the hydraulic pressure is sampled at a predetermined stroke interval. The reference value computing device 61 computes the reference characteristics at the predetermined hydraulic pressure sampling stroke interval. The computation is made to determine the reference value in accordance with the following formula (1), neglecting the largely fluctuating portion of the reference characteristics which tend to cause an erroneous judgement.

$$g(x) = a + b.X + c.X^2 + d.X^3 + e.X^4 + f.X^5 \qquad (1)$$

where, g(x): reference hydraulic pressure function (Kg/cm² g)

a,b: coefficients

X: closing stroke of the valve body (%)

Figure 6:
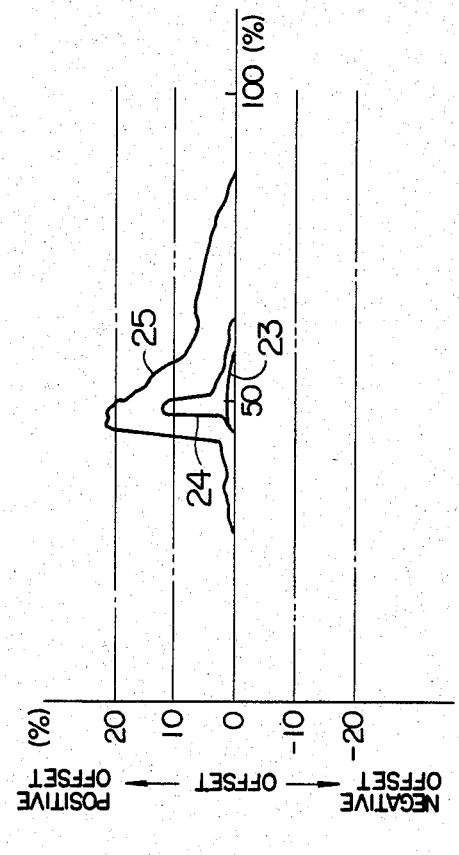
FIG. 6 is an illustraton of the state in which the offset of the actual hydraulic pressure variation characteristics from the reference characteristics is changed due to an occurrence of a sticking of the valve.

The reference hydraulic pressure is computed in accordance with the formula (1) at the constant sampling interval to determine a reference hydraulic pressure curve 22. These reference hydraulic pressures are stored in a reference value storage device 62. Subsequently, an offset of the actually measured value 21 from the reference value 22 is determined by the offset computing device 63 in accordance with the following formula (2).

$$\Delta(x) = f(x) - g(x) \quad (2)$$

where,

Δ(x): offset function
f(x): actually measured hydraulic pressure function
g(x): reference hydraulic pressure function In FIG. 6, the abscissa represents the closing valve stroke (%) while the ordinate represents the offset of the hydraulic pressure (%) in the hydraulic cylinder for driving the valve body. Positive offset is shown above the horizontal line representing zero offset, while negative offset is shown below the same line. The offset levels ±10% are determined as valve sticking symptom levels, while the offset levels ±20% are determined as being alarming levels. The sticking symptom levels and alarming levels can be selected at any other levels than mentioned above, in accordance with experience and data accumulated in the past. The curve 23 substantially coincides with the horizontal line representintg the zero offset. Thus, the valve device is judged to be almost in a perfect condition when the hydraulic pressure offset values follow this curve 23. The curve 24 involves a peak which exceeds the stick symptom level athough it is still below the alarming level. When the offset hydraulic pressure follows this curve 24, it is judged that there is a symptom of any trouble in the valve device. The curve 25 exhibits a peak value which exceeds the alarming level. This means that the sticking of the valve will take place very soon, although it has not yet actually occurred.

The reference offset value memory device 65 shown in FIG. 4 stores the offset level of 10% as the stick symptom level and offset level of 20% as the alarming level. These levels are compared in the offset comparator 64 with the offset values computed by the offset computing device 63 and the result of the comparison is classified by the offset judging device 6 into the folowing three classes: namely, normal state (below 10%), sticking symptom state (between 10% and 20%) and dangerous state (above 20%). The result of the classification is displayed on the display device 67.

Although in the foregoing description the judgement is made by obtaining the required data during the movement of the valve body from the fully open position to the fully close position, the same judgement for the valve sticking symptom can be made with data obtained during movement of the valve body from the full close position to the full open position. In the latter case, however, the symptom appears as negative offset of hydraulic pressure.

As stated hereinbefore, the comparing and computing devices incorporated in the diagnostic appratus of this embodiment functions to store the reference offset value and to judge the offset value through comparison with the reference offset value. It is, therefore, possible to fully automatically judge whether there is any abnormality in the valve device without requiring any human judgement. In addition, the operator can be aware of any symptom of abnormality or trouble without any specific skill or mental burden, if a suitable instrument such as alarming lamp, buzzer, printer or the like is provided for displaying the result of the judgement as in the case of the described embodiment.

In the first embodiment, the reference hydraulic pressure is computed at a constant stoke interval in synchronism with the actual measurement of the hydraulic pressure. This, however, is not exclusive and the arrangement may be such that the stroke values of the valve in the normal state of the valve device are determined in accordance with experience values and reference pressure values corresponding to the stroke values are beforehand computed and memorized for the comparison with the actually measured pressures.

As shown in FIG. 5, when there is any symptom of a sticking of the valve, the rate of fluctuation of hydraulic pressure is locally increased during the movement of the valve body 4 between the full open position and full close position. The presence of a symptom of valve sticking, therefore, can be detected through computation and observation of the rate of fluctuation of the hydraulic pressure.

Figure 7:
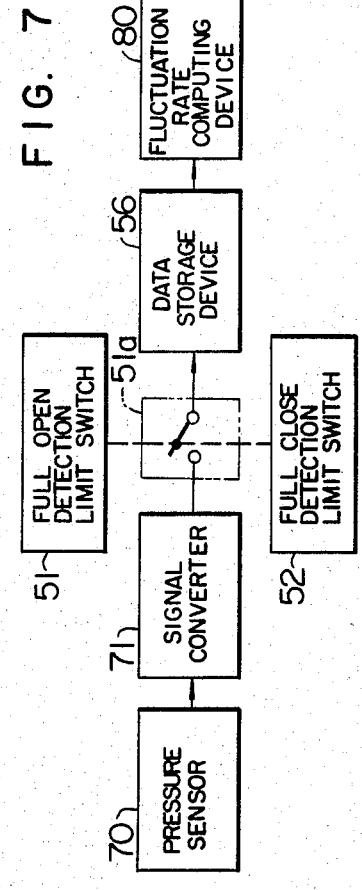
FIG. 7 shows the construction of a processing unit incorporated in a turbine valve device diagnostic apparatus in accordance with a second embodiment of the invention.

In the embodiment of FIG. 7, pressure datum are stored in the data storage device 56 in the period after the fully open detection limit switch 51 or the fully closed detection limit switch 52 senses the start of movement of the valve body 4 until the fully open or fully closed state of the valve is detected by the limit switch, and the rate of fluctuation of the pressure value is computed by a fluctuation rate computing device 80, the result of which is stored in a fluctuation rate storage device 81. Meanwhile, reference fluctuation rates are prestored in a reference fluctuation rate storage device 82. The computed fluctuation rate is then compared with the reference fluctuation rate read out from the storage device 82, by means of a fluctuation rate comparator 83. The result of the comparison is judged by a fluctuation rate judging device 84 which delivers a signal representing the result of the judgement to the display device 67.

Figure 8:
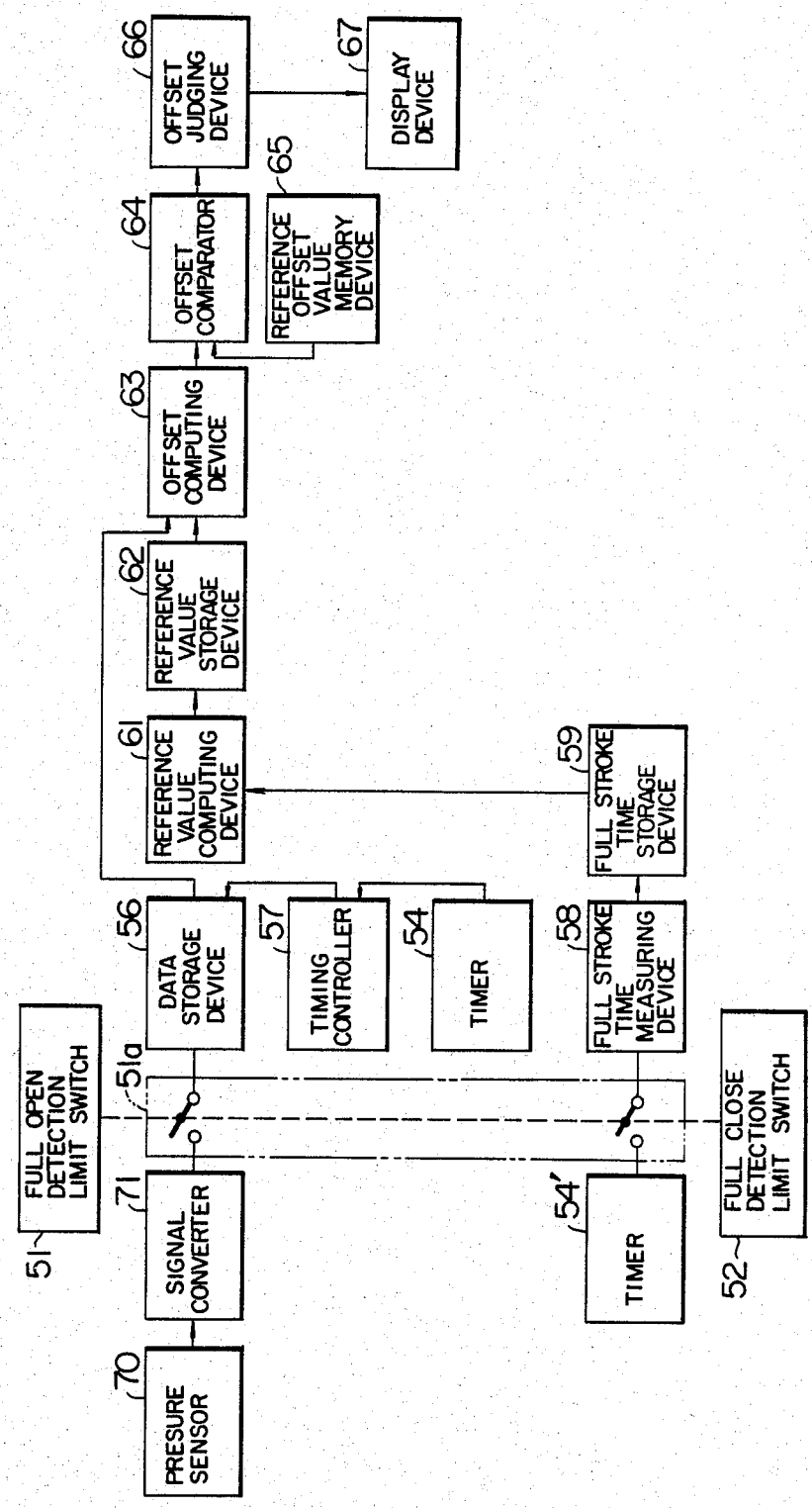
FIG. 8 shows the construction of a processing unit incorporated in a turbine valve device diagnostic apparatus in accordance with a third embodiment of the invention.

The symptom of a valve sticking can be detected also by observing how the hydraulic pressure is changed in relation to time, as in the third embodiment shown in FIG. 8. More particularly, in FIG. 8, the signal from the pressure sensor 70 is fed to the signal converter 71 the output of which is delivered to the data storage device 56 through a switch 51a which is adapted to be opened and closed by the operation of the fully open detection limit switch 51 and the fully closed detection limit switch 52. When the switch 51a takes the closed state, the signal representative of the actually measured hydraulic pressure coming from the signal converter 71 is stored in the data storage device 56. At the same time, a time signal is delivered by a timer 54 to the timing controller 57 which functions to make the data storage device 56 periodically store the input from the signal converter 71 upon receipt of the time signal. A time signal from another timer 54' is delivered to a full stroke time measuring device 58 through the switch 51a which is opened and closed by the operation of the full open detection limit switch 51 and the fully closed detection limit switch 52. The measuring device 58 measures the time length required for the valve member to travel the whole stroke length from the full open position to the full close position or from the full close position to the full open position. The result of the measurement of time is stored in the full stroke time storage device 59. The stored signal is then delivered to a reference value computing device 61 which computers the refernce hydraulic pressure using the full stroke time as a parameter, the result of which is stored in the reference value storage device 62. Then, the offset of the actually measured pressure value stored in the data storage device 56 is compared by an offset computing device 63 with the reference hydraulic pressure value stored in the reference value storage device 62. The computed offset is then compared by the offset comparator 64 with the reference value which is beforehand stored in the reference offset value memory device 65. The result of the comparison made in the offset comparator 64 is fed into the offset judging device 66 which judges the state of operation of the valve device. The result of the judgement is put on display on the display device 67.

Figure 9:
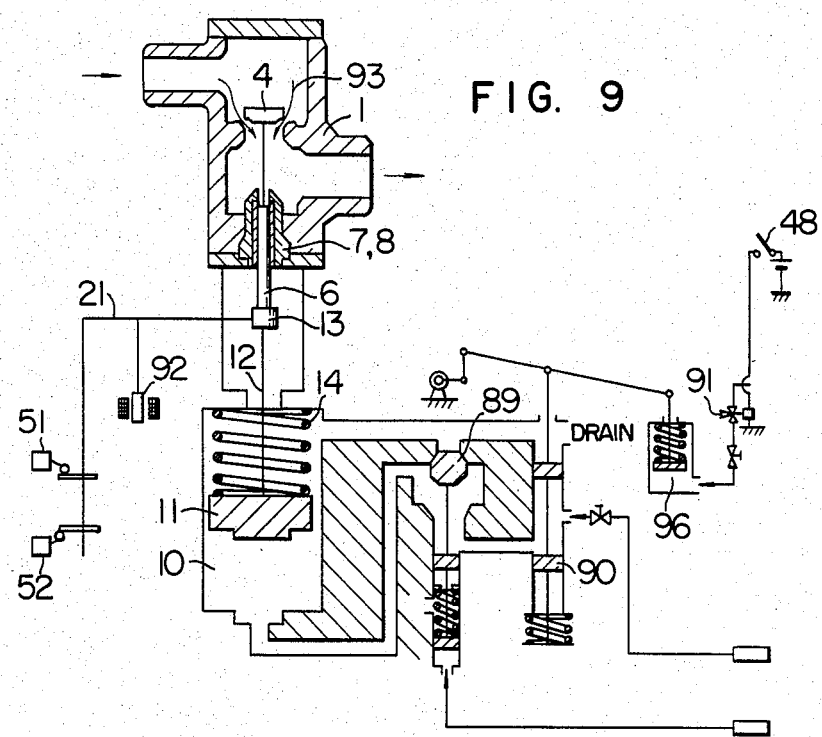
FIG. 9 is a schematic illustration of the major steam stop valve equipped with a turbine valve device diagnostic apparatus in accordance with a fourth embodiment of the invention.

As shown in FIG. 9, the valve device apparatus has a position sensor 92 connected through a lever device 21 to the coupling 13 between the valve rod 6 and the piston rod 12 and adapted to detect the position or movement of the valve body 4, a limit switch 51 for detecting that the valve body is in the fully open position and a limit switch 52 adapted for detecting that the valve body 4 is in the fully closed position. In FIG. 9, the valve device diagnostic apparatus is combined with a main steam stop valve and manual valve testing device which are of the same type as those explained before in connection with FIGS. 1 and 2. As will be understood from a comparison between FIG. 9 and FIG. 2, the diagnostic apparatus of FIG. 9 is devoid of the pressure sensor 70 which is used in the first embodiment shown in FIG. 2 for sensing the hydraulic pressure in the hydraulic cylinder 10.

Figure 10:
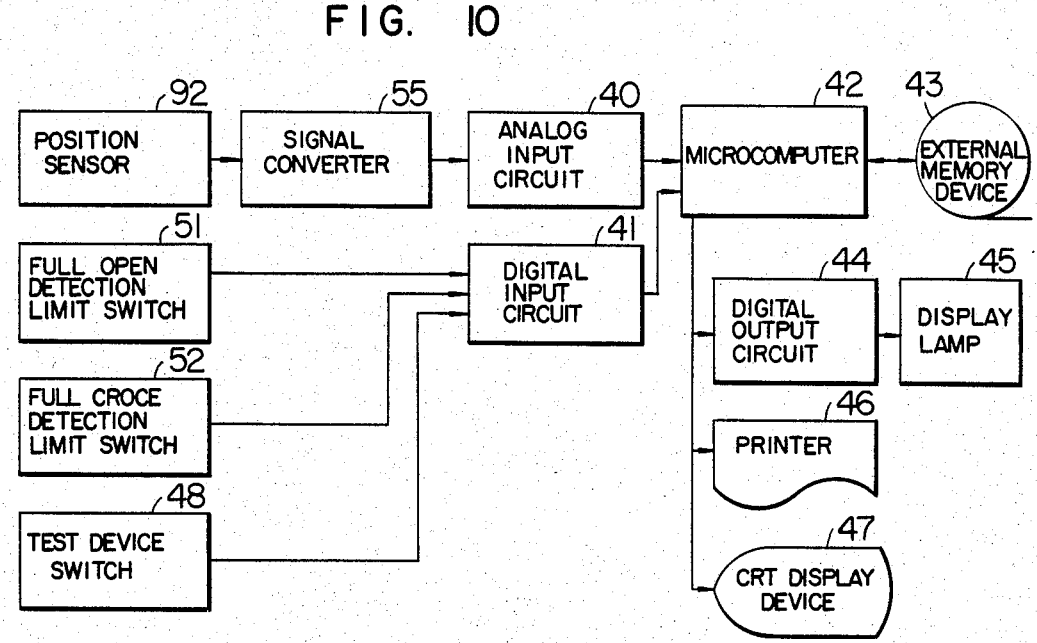
FIG. 10 is a block diagram of the hardware of the fourth embodiment.
Figure 11:
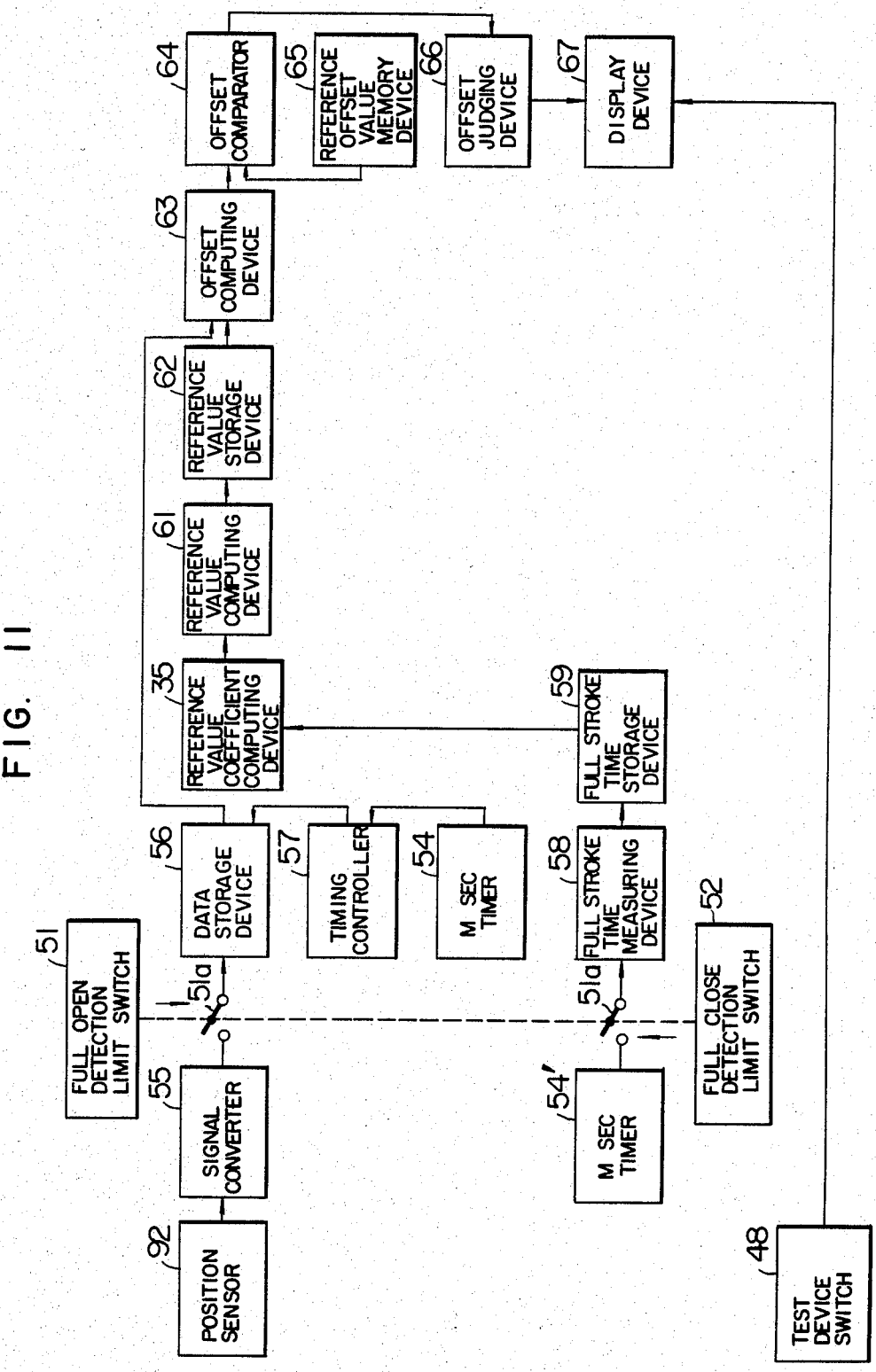
FIG. 11. is a block diagram of a processing unit incorporated in the fourth embodiment.

As shown in FIG. 10, the diagnostic apparatus of FIG. 9 includes a digital input circuit 41 for receiving the output signals from the fully open detection limit switch 51, fully closed detection limit switch 52 and the test device operation switch 48. The output signal from the position sensor 92 is converted by a signal converter 55 into a voltage or electric current signal corresponding to the motion or stroke of the valve body, and is fed to an analog input circuit 40. The signals delivered to the analog input circuit 40 and the digital inout circuit 41 are processed by a microcomputer 42, and the result of the processing is sent through a digital output circuit 44 to a display lamp 45 for the display. The result of the processing is also delivered to a printer 46 or a CRT display device 47. The data obtained in the past are stored in an external memory device 43 and are read out as required. The construction of the processing device incorporated in the embodiment of FIG. 9 will be described hereinunder with reference to FIG. 11. The movement or stroke travelled by the valve rod 6 is sensed by the position sensor 92 and is delivered to the signal converter 55 the output of which is delivered to a data storage device 56 through a switch 51a which is adapted to be opened and closed by the operation of the fully open detection limit switch 51 and the fully closed detection limit switch 52. When switch 51a is kept closed, the stroke signal derived from the signal converter 55 is delivered to the data storage device 56. At the same time, a storage timing controller 57 delivers, upon receipt of a signal from a m sec timer 54, a storage timing signal to the data storage device 56. The signal from the converter 55 is stored in the data storage device 56 in accordance with this storage timing signal. Simultaneously, a signal representative of the full stroke time is fed to the full stroke time storage device 59. Namely, a signal from another m sec timer 54' is delivered to and stored in the full stroke time storage device 59 through the switch 51a which is opened and closed by the full open detection limit switch 51 and the full close detection limit switch 52 and then through a full stroke time measuring device 58. The full stroke time stored in the full stroke time storage device 59 is fed to a reference value coefficient computing device 35 and the result of the computation performed by the device 35 is delivered to the reference value computing device 61. The result of the computation performed by the device 61 is delivered to a reference value storage device 62 and then fed to an offset computing device 63. The offset computing device 63 receives also the data derived from the data storage device 56. Then, the output from the offset computing device 63 and the refernce offset value memorized in the refernce offset value memory device 65 are fed to an offset comparator 64 the output of which is delivered to the display device 67 through the offset judging device 66.

The diagnostic apparatus of the embodiment of FIG. 9 operates in a manner explained hereinunder. As the test device operation switch 48 is closed, the test device solenoid valve 91 is opened to permit compressed air to enter a pneumatic cylinder 96 to thereby drive a relay piston so that the valve body 4 of the main steam stop valve 4 starts to close. Simultaneously, the diagnostic apparatus is prepared for the diagnostic operation, and the number of the valve to be tested is memorized in the apparatus. As the valve body 4 starts to move in the closing direction, the fully open detection limit switch 51 is opened to close the associated switch 51a so that the signals from the position sensor 92 and the signal converter 55 are fed to the data storage device 56. On the other hand, the full stroke time measuring device 58 is electrically connected to the m sec timer 54' to start the time measurement. Since the capacity of the data storage device 56 is limited, the datum have to be sampled at a constant interval. Therefore, the obtained signals are transmitted to the data storage device 56 at a predetermined time interval. Namely, the signal coming from the m sec timer 54 is integrated in the storage timing controller 57 and the above-mentioned signal is issued at each time the integrated value raches a predetermined value. Thus, the stroke signals are fed to the data storage device 56 at a predetermined time interval during the movement of the valve body from the full open position to the full close position. Then, as the fully closed detection limit switch 52 is turned on, the supply of the stroke signal to the data storage device 56 is stopped. Simultaneously, the supply of the signal from the m sec timer 54' to the full stroke time measuring device 58 is also stopped and the full stroke time is stored in the storage device 59. An example of the stored data is shown in FIG. 12.

Figure 12:
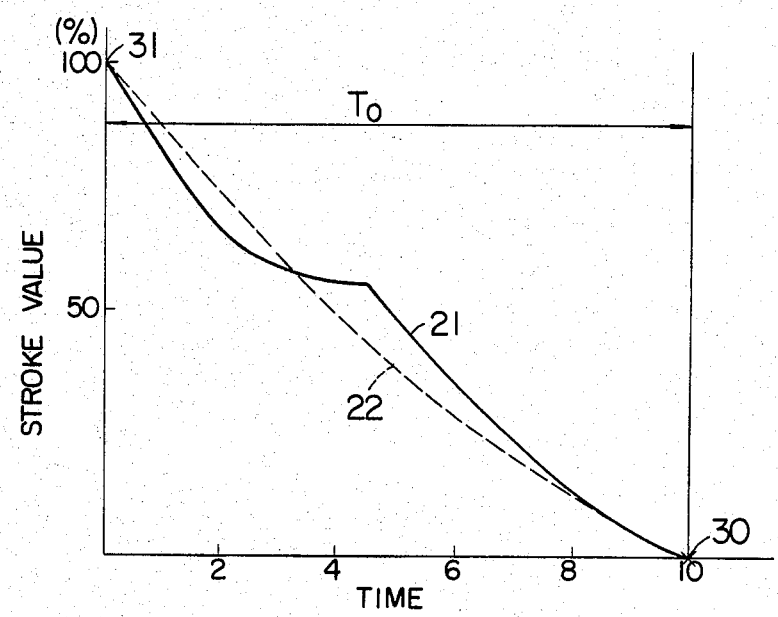
FIG. 12 shows an example of the actually measured stroke variation characteristics of the major steam stop valve, in comparison with the reference values.

Referring now to FIG. 12, the abscissa represents the time (second) while the ordinate represents the stroke value (%). A full-line curve 21 shows the actually measured stroke values mentioned above. Needless to say, the curve 21 consists of a numerous dots because the values constituting this curve are obtained by sampling made at a predetermined time interval, although it appears as a continuous curve. The full stroke time To is the time elapsed until the stroke value becomes 100%, i.e. until the time (reference numeral 30) at which the valve member is moved to the full close position. Using this full stroke time as a parameter, the coefficient computing device 35 computes the coefficient of a reference value computation formula and, with this coefficient, reference values are computed by the reference value computing device 61 to draw a reference value curve which is shown in FIG. 12 bearing a reference numeral 22. The function for computing the reference value curve is represented by the following formula (3).

$$g(t) = 100 + AK_1 t + BK_2 t^2 + CK_3 t^3 + DK_4 t^4 + EK_5 t^5 \quad (3)$$

where, g(t): reference stroke value function (%)

$K_1, K_2, K_3, K_4, K_5$: . . . reference value computation coefficients.

t: (sec)

A,B,C,D,E: coefficients

From the formula (3) above, reference stroke is determined for each sampling interval of the actually measured stroke curve 21 and is stored in the reference stroke value storage device 62.

Figure 13:
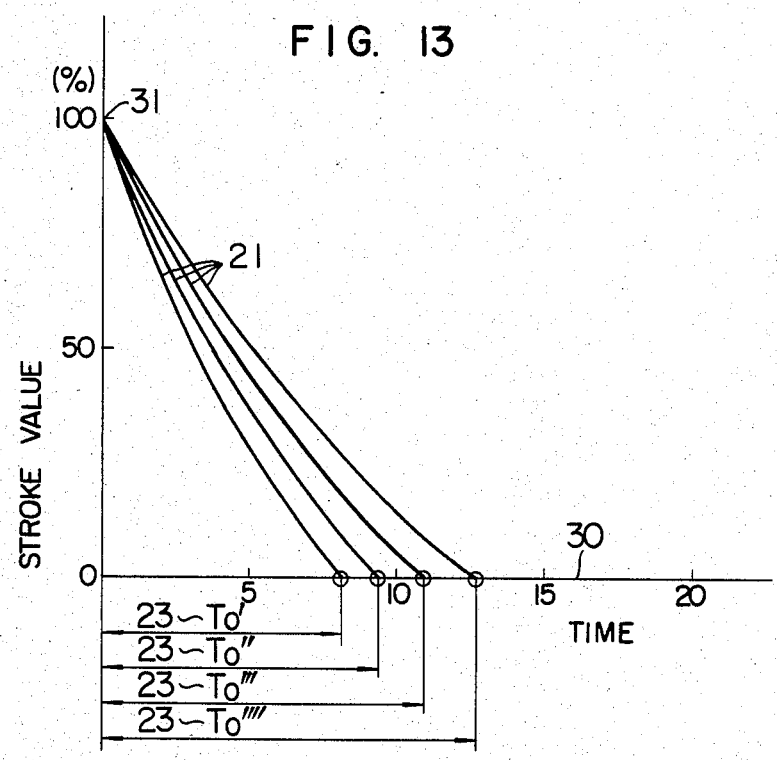
FIG. 13 shows the fluctuation of the actually measured stroke variation characteristics.

One of the features of the embodiment of FIG. 9 resides in the computation of the reference stroke. The stroke of the main steam stop valve fluctuates more or less even when the same is in normal state. This means that the reference values are not always constant. Namely, the curve 21 representing the actually measured stroke values is fluctuated as shown in FIG. 13, followed by a fluctuation in the full stroke time as To', To", To''', To''''. In the embodiment of FIG. 9, the actually measured full stroke time To is used as the parameter in the computation of the reference stroke curve. It is, therefore, possible to obtain a reference stroke curve corresponding to the actually measured stroke time, so that the above-mentioned fluctuation is advantageously negated.

Subsequently, the offset of the actually measured value 21 from the reference value 22 is determined by the offset computing device 63 in accordance with the following formula (4).

$$\Delta(t) = f(t) - g(t) \qquad (4)$$

where, $\Delta(t)$: offset function f(t): actually measured stroke function g(t): reference stroke function The result of computation of the offset is shown in FIG. 14. More specifically, the abscissa represents the time (sec) while the ordinate represents the stroke offset (%). Positive offset (%) is shown above a horizontal line representing the zero offset while negative offset (%) is shown below the same horizontal line. The motion of the valve body is started from the fully open position 31 and is ended at fully closed position 30. Three offset curves are drawn in FIG. 14. The offset values are compared in the offset comparator 64 with predetermined reference offset values such as alarming level or valve sticking symptom level, and is judged by means of the offset judging device 66. For instance, the offset curve 26 shown in FIG. 14 has a peak value exceeding the alarming level 33. This means that there is a large possibility of stick of valve in the very near future. The curve 27 has a peak value which is below the alarming level 33 but exceeds a symptom level 29. This means that there is a symptom of a valve sticking. The offset curve 28 shows the offset values as obtained when the valve device is in normal state. The judgement is made by the offset judging device 66 and the result of the judgement is displayed on the display device 67. In the foregoing description of operation of the embodiment of FIG. 9, the test device switch 48 is turned on to move the valve body from the fully open position to the fully closed position. The valve body is returned to the fully open position as the test device switch 48 is turned off. The detection of symptom of valve sticking can be made equally during the movement of the valve body from the fully closed position to the fully open position.

As will be understood from the foregoing description, where there is an offset between the actually measured stroke characteristics from the normal or sound stroke characteristics, i.e. computed reference values, in excess of a predetermined offset value, there is an intial symptom of valve sticking such as vibration, chattering, or scuffing in the driving characteristics, of the valve rod. Namely, a fluctuation of friction in the sliding part is taking place to cause an offset of the actual stroke characteristics from the sound stroke characteristics. It is, therefore, possible to forecast the occurrence of the valve sticking or to detect any trouble at an early stage to avoid the occurrence of serious accident, by judging the actually measured stroke characteristics from the sound stroke characteristics.

As will be understood from the foregoing description, according to the invention, it is possible to detect any slight symptom of troubles in valve devices of a turbine system with a high sensitivity and accuracy.

What is claimed is:

1. A diagnostic apparatus for diagnosing a state of a valve device in a turbine system, said apparatus comprising:

first sensor means for sensing the state of operation of said valve device;

second sensor means to sense that said valve device is in a fully open position;

third sensor means to sense that said valve device is in a fully closed position;

processing means connected to said first sensor means and to judge whether there is any abnormality in the operation of said valve device in accordance with the output from said first sensor means and to display the result of the judgement; and means for interrupting the operative connection between said first sensor means and said processing means when one of the fully opened position and the full closed position of said valve device is sensed by one of said second sensor means respectively and said third sensor means.

2. A diagnostic apparatus according to claim 1, wherein said first sensor means includes a pressure sensor for detecting the hydraulic pressure in a hydraulic cylinder for driving a valve body of said valve device, and a position sensor for detecting the displacement of said valve body; and wherein said processing means includes data storage means for storing the hydraulic pressure values in said hydraulic cylinder in relation to said displacement of said valve body, said hydraulic pressure values being obtained in accordance with the output signals from said pressure sensor and said position sensor, reference value storage means for storing the reference hydraulic pressure values representing the normal operating state of said valve device, offset computing means for computing the offset of the hydraulic pressure values stored in said data storage means from the reference hydraulic pressure values stored in said reference value storage means, and judging means for making a judgement as to whether there is any abnormality in the state of operation of said valve device in accordance with the offset values as computed by said offset computing means.

3. A diagnostic apparatus according to claim 2, wherein said judging means includes reference offset value storage means for storing reference offset values representing an abnormal state of operation of said valve device, and an offset comparator adapted to make a comparison between the offset values computed by said offset computing means and the refrence offset values stored in said reference offset value storage means.

4. A diagnostic apparatus according to claim 2 or 3, wherein said processing means includes reference value computing means for computing said reference hydraulic pressure values using as a parameter the displacement of said valve body, and said reference value storage means is constituted to store said reference hydraulic pressure values computed by said reference value computing means.

5. A diagnostic apparatus according to claim 2 or 3, wherein said processing means includes sampling means for causing said data storage means to be supplied with the hydraulic pressure values in said hydraulic cylinder intermittently at each time said valve body travels a predetermined stroke distance.

6. A diagnostic apparatus according to claim 1, wherein said first sensor means includes a pressure sensor for sensing the hydraulic pressure in a hydraulic cylinder for driving a valve body of said valve device; and wherein said processing means includes data storage means for storing the hydraulic pressure values detected by said pressure sensor, fluctuation rate computing means for computing the rate of fluctuation of the hydraulic pressure values stored in said data storage means during the movement of said valve body between said full open position and said full close position, a fluctuation rate comparator adapted to compare the fluctuation rate computed by said fluctuation rate computing means with a reference hydraulic pressure fluctuation rate representing the abnormal operating state of said valve device, and judging means for judging whether there is any abnormality in said valve device in accordance with the output from said fluctuation rate comparator.

7. A diagnostic apparatus according to claim 1, wherein said first sensor means includes a pressure sensor for sensing the hydraulic pressure in a hydraulic cylinder for driving a valve body of said valve device; and wherein said processing means includes full stroke time measuring means for measuring the time length required for said valve body to travel the whole stroke between said full open position and said full close position, data storage means for storing the hydraulic pressure values as obtained through said pressure sensor during the whole stroke travelling of said valve body, reference value computing means to compute reference hydraulic pressure values representing the abnormal operating state of said valve device, using as a parameter the time length measured by said full stroke time measuring means, offset computing means for computing the offset of the hydraulic pressure values stored in said data storage means from said reference hydraulic pressure values computed by said reference value computing means, and judging means for judging whether there is any abnormality in said valve device in accordance with the offset values as computed by said offset computing means.

8. A diagnostic apparatus according to claim 7, wherein said judging means includes an offset comparator for comparing the offset computed by said offset computing means with a reference offset value representing the abnormal state of said valve device.

9. A diagnostic apparatus according to claim 7 or 8, wherein said processing means further includes sampling means for causing said data storage means to be supplied with the hydraulic pressure values obtained through said pressure sensor intermittently at each time the operation time of said valve device reaches a predetermined time length.

10. A diagnostic apparatus according to claim 1, wherein said first sensor means includes a position sensor to sense the displacement of a valve body of said valve device during operation of said valve device; and wherein said processing means includes full stroke time measuring means for measuring the time length required for said valve body to travel the whole stroke between said full open position and said full close position, data storage means for storing data concerning the movement of said valve body as sensed by said position sensor during the whole stroke travelling of said valve body, reference value computing means for computing, using as a parameter the time length measured by said full stroke time measuring means, the reference value of movement of said valve body representing the normal state of said valve device, offset computing means for computing the offset of the data stored in said data storage means from the reference values computed by said reference value computing means, and judging means for judging whether there is any abnormality in said valve device in accordance with the output signal from said offset computing means.

11. A diagnostic apparatus according to claim 10, wherein said judging means includes an offset comparator for making a comparison between the offset computed by said offset computing means and the reference offset value representing an abnormal state of said valve device.

12. A diagnostic apparatus according to claim 10 or 11, wherein said processing means includes sampling means for causing said data storage means to be supplied with the data concerning the state of movement of said valve body as sensed by said position sensor intermittently at each time the operation time of said valve device reaches a predetermined time length.

* * * * *